US009855845B2

(12) United States Patent
Isobe et al.

(10) Patent No.: US 9,855,845 B2
(45) Date of Patent: Jan. 2, 2018

(54) VEHICLE-MOUNTED DISPLAY DEVICE

(71) Applicant: HONDA MOTOR CO., LTD., Tokyo (JP)

(72) Inventors: Arata Isobe, Wako (JP); Kazuyoshi Fukutani, Wako (JP); Takahiro Abe, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 105 days.

(21) Appl. No.: 14/784,719

(22) PCT Filed: Mar. 31, 2014

(86) PCT No.: PCT/JP2014/059478
§ 371 (c)(1),
(2) Date: Oct. 15, 2015

(87) PCT Pub. No.: WO2014/171319
PCT Pub. Date: Oct. 23, 2014

(65) Prior Publication Data
US 2016/0059701 A1 Mar. 3, 2016

(30) Foreign Application Priority Data

Apr. 19, 2013 (JP) ................................ 2013-088379

(51) Int. Cl.
*B60K 37/06* (2006.01)
*B60K 35/00* (2006.01)
(Continued)

(52) U.S. Cl.
CPC .............. *B60K 37/06* (2013.01); *B60K 35/00* (2013.01); *B60K 2350/1024* (2013.01);
(Continued)

(58) Field of Classification Search
CPC ........... G02F 1/13338; G02F 1/133602; G02F 1/133606; B32B 2457/208;
(Continued)

(56) References Cited

U.S. PATENT DOCUMENTS 6,119,060 A 9/2000 Takayama et al.
9,035,851 B2 5/2015 Noma
(Continued)

FOREIGN PATENT DOCUMENTS

EP 1 933 229 A1 6/2008
JP H11-312024 A 11/1999
(Continued)

OTHER PUBLICATIONS

Japanese Office Action dated Mar. 8, 2017.
International Search Report, dated May 20, 2014 (May 20, 2014).
Japanese Office Action dated Aug. 3, 2016, 3 pages.

*Primary Examiner* — Angela Davison
(74) *Attorney, Agent, or Firm* — Rankin, Hill & Clark LLP

(57) ABSTRACT

A vehicle-mounted display device includes a software switch region in which a first transparent resin layer, a symbol and design printed layer, a smoke printed layer, a first touch sensor sheet, and a diffusion sheet are layered in order from the front side toward the back side, and a liquid crystal touch panel region in which a second transparent resin layer, a second touch sensor sheet, and a liquid crystal sheet are layered in order from the front side toward the back side. Since the software switch region includes the diffusion sheet, not only is it possible to ensure the visibility when sunlight shines, but it is also possible to prevent the internal structure from being seen when the light source is turned off, thus enhancing the quality of the external appearance.

9 Claims, 3 Drawing Sheets

(51) Int. Cl.
*G02F 1/1333* (2006.01)
*G06F 3/041* (2006.01)

(52) U.S. Cl.
CPC ............. *B60K 2350/1028* (2013.01); *B60K 2350/1036* (2013.01); *B60K 2350/2078* (2013.01); *B60K 2350/2086* (2013.01); *B60K 2350/2091* (2013.01); *G02F 1/13338* (2013.01); *G06F 3/041* (2013.01)

(58) Field of Classification Search
CPC .... B60K 2350/1024; B60K 2350/1028; B60K 2350/1036; B60K 2350/2086; B60K 2350/2091; B60K 2350/1032; B60K 2350/106; B60K 2350/2039; B60K 2350/2043; B60K 2350/2095; B60K 2350/967; B60K 2350/1056; G06F 3/041; G06F 3/0412
USPC .......................... 349/12, 73; 345/173–178; 178/18.01–18.11
See application file for complete search history.

(56) References Cited

U.S. PATENT DOCUMENTS

| 2009/0268163 | A1* | 10/2009 | Bowden | G01C 21/365 353/13 |
| 2012/0256859 | A1* | 10/2012 | Noma | G09G 5/10 345/173 |
| 2013/0002608 | A1* | 1/2013 | Autran | B60K 35/00 345/174 |

FOREIGN PATENT DOCUMENTS

| JP | 2000-329577 | 11/2000 |
| JP | 2002-505783 A | 2/2002 |
| JP | 2005-077874 | 3/2005 |
| JP | 2008-175584 | 7/2008 |
| JP | 2012-220550 A | 11/2012 |
| WO | 2011/021406 | 2/2011 |

\* cited by examiner

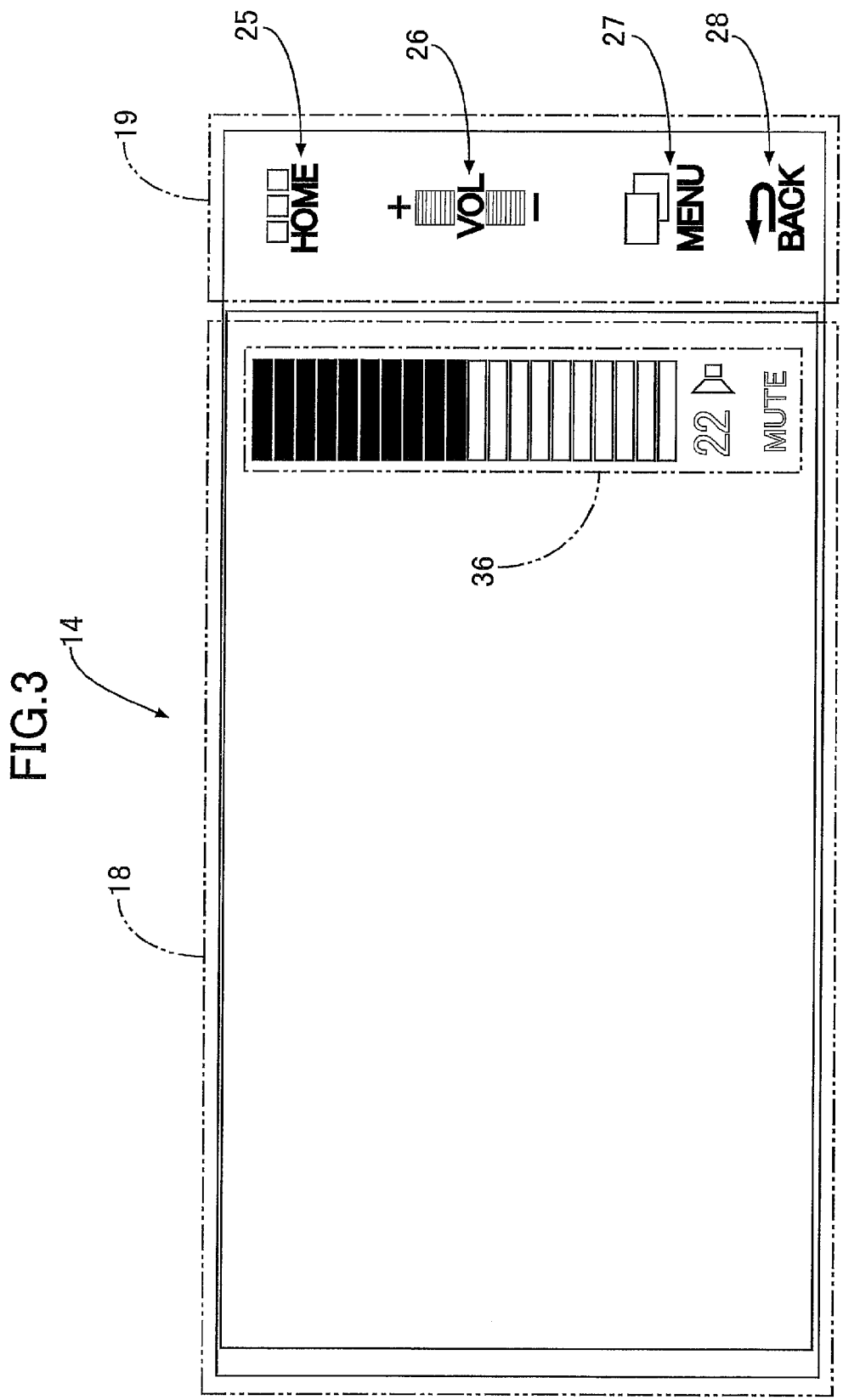

VEHICLE-MOUNTED DISPLAY DEVICE

TECHNICAL FIELD

The present invention relates to a vehicle-mounted display device that includes a software switch region in which a first transparent resin layer, a symbol and design printed layer, a smoke printed layer, a first touch sensor sheet, and a diffusion sheet are layered in order from the front side toward the back side, and a liquid crystal touch panel region in which a second transparent resin layer, a second touch sensor sheet, and a liquid crystal sheet are layered in order from the front side toward the back side.

BACKGROUND ART

A vehicle-mounted display device in which a translucent layer having a design light transmission part is layered on the back side of a transparent board of a meter panel of an automobile, and light emitted from a light source and passing through the design translucent part of the translucent layer is viewed from the front side of the board is known from Patent Document 1 below, in which layered on the front face of the board are a smoke printed layer that is a semitransparent layer for darkening and a pearl printed layer that diffuses and reflects light entering from the front side, thus making it difficult for the design translucent part to be seen when the light source is turned off as well as imparting to the front face of the board a flat silver color tone to thus enhance the aesthetics.

RELATED ART DOCUMENTS

Patent Documents

Patent Document 1: Japanese Patent Application Laid-open No. 2008-175584

SUMMARY OF THE INVENTION

Problems to be Solved by the Invention

If a switch function is imparted to a screen of this type of vehicle-mounted display device by incorporating a touch sensor sheet, it becomes unnecessary to provide a large number of hard switches, which have projections and depressions, the front face of the vehicle-mounted display device can be made flat, and a simple design becomes possible. However, the operability of such a vehicle-mounted display device is not good.

The present invention has been accomplished in light of the above circumstances, and it is an object thereof to enhance the operability of a software switch of a vehicle-mounted display device.

Means for Solving the Problems

In order to attain the above object, according to a first aspect of the present invention, there is provided a vehicle-mounted display device comprising a software switch region in which a first transparent resin layer, a symbol and design printed layer, a smoke printed layer, a first touch sensor sheet, and a diffusion sheet are layered in order from a front side toward a back side, and a liquid crystal touch panel region in which a second transparent resin layer, a second touch sensor sheet, and a liquid crystal sheet are layered in order from the front side toward the back side, wherein the software switch region is fruited such that a symbol and design printed on the symbol and design printed layer is visible from the front side by shining light from a light source from the back side.

Further, according to a second aspect of the present invention, in addition to the first aspect, when the software switch region is in an inactive state in which the software switch region does not accept an operation, the software switch region displays the inactive state by turning off the light source or reducing luminance of the light source.

Furthermore, according to a third aspect of the present invention, in addition to the first or second aspect, when the software switch region is operated, a region that can accept an operation is enlarged in the liquid crystal touch panel region.

Moreover, according to a fourth aspect of the present invention, in addition to any one of the first to third aspects, the first transparent resin layer and the second transparent resin layer are formed as one and the same continuous layer.

Further, according to a fifth aspect of the present invention, in addition to any one of the first to fourth aspects, the first touch sensor sheet and the second touch sensor sheet are formed as one and the same continuous sheet.

Furthermore, according to a sixth aspect of the present invention, in addition to any one of the first to fifth aspects, the software switch region is disposed at a position closer to a driver than is the liquid crystal touch panel region.

Moreover, according to a seventh aspect of the present invention, in addition to any one of the first to fifth aspects, a hard switch that can be operated even when the software switch region and the liquid crystal touch panel region are in the inactive state is provided outside the software switch region and the liquid crystal touch panel region.

A power switch 15, a disk eject switch 16, and a screen switching switch 17 of an embodiment correspond to the hard switch of the present invention, and a translucent portion 21*a* of the embodiment corresponds to the symbol and design of the present invention.

Effects of the Invention

In accordance with the first aspect of the present invention, the vehicle-mounted display device includes the software switch region, in which the first transparent resin layer, the symbol and design printed layer, the smoke printed layer, the first touch sensor sheet, and the diffusion sheet are layered in order from the front side toward the back side, and the liquid crystal touch panel region in which the second transparent resin layer, the second touch sensor sheet, and the liquid crystal sheet are layered in order from the front side toward the back side. Since the software switch region includes the diffusion sheet, not only is it possible to ensure the visibility when sunlight shines directly on the first transparent resin layer without specially enhancing the luminance of the light source, but it is also possible, by covering the translucent part of the symbol and design printed layer with the diffusion sheet, to prevent the internal structure of the vehicle-mounted display device from being seen when the light source is turned off, thus enhancing the quality of the external appearance.

Furthermore, the software switch not only has excellent durability due to there being fewer mechanical parts compared with a hard switch, but the degree of freedom in design is also increased due to it having no projecting portions. Moreover, since switching can be carried out by the use in combination of the software switch region, which has higher visibility compared with the liquid crystal screen, and the liquid crystal touch panel region, which can display various images, it is possible to achieve a balance between visibility and operability.

Moreover, in accordance with the second aspect of the present invention, when the software switch region is in an inactive state in which it does not accept an operation, since the light source is turned off or the luminance of the light source is decreased to thus display the inactive state, it is possible to easily determine by eye whether or not the software switch region is in the inactive state.

Furthermore, in accordance with the third aspect of the present invention, since when the software switch region is operated, a region that can accept an operation is enlarged in the liquid crystal touch panel region, it becomes possible to carry out on the liquid crystal touch panel a delicate operation or a complicated operation that is too difficult to carry out with the software switch alone, thereby further improving the operability.

Moreover, in accordance with the fourth aspect of the present invention, since the first transparent resin layer and the second transparent resin layer are formed from one and the same continuous layer, the front face of the vehicle-mounted display device becomes a flat shape without any steps, not only does the design improve, but movement of a finger between the software switch region and the liquid crystal touch panel region also becomes smooth, thus improving the operability.

Furthermore, in accordance with the fifth aspect of the present invention, since the first touch sensor sheet and the second touch sensor sheet are formed from one and the same continuous sheet, it is possible to reduce the cost by sharing a detection circuit for touch operation and a signal transmission circuit for an arithmetic processing unit.

Moreover, in accordance with the sixth aspect of the present invention, since the software switch region is disposed at a position closer to the driver than is the liquid crystal touch panel region, it is possible to quickly carry out an operation with high frequency or an operation with high urgency.

Furthermore, in accordance with the seventh aspect of the present invention, since the hard switch, which can be operated even when the software switch region and the liquid crystal touch panel region are in the inactive state, is provided outside the software switch region and the liquid crystal touch panel region, even when the first and second touch sensor sheets are not activated, an operation with high importance or an operation with high urgency can be carried out reliably and quickly.

BRIEF DESCRIPTION OF DRAWINGS

FIG. 3 is a view showing a screen of the vehicle-mounted display device. (first embodiment)

EXPLANATION OF REFERENCE NUMERALS AND SYMBOLS

Figure 1:
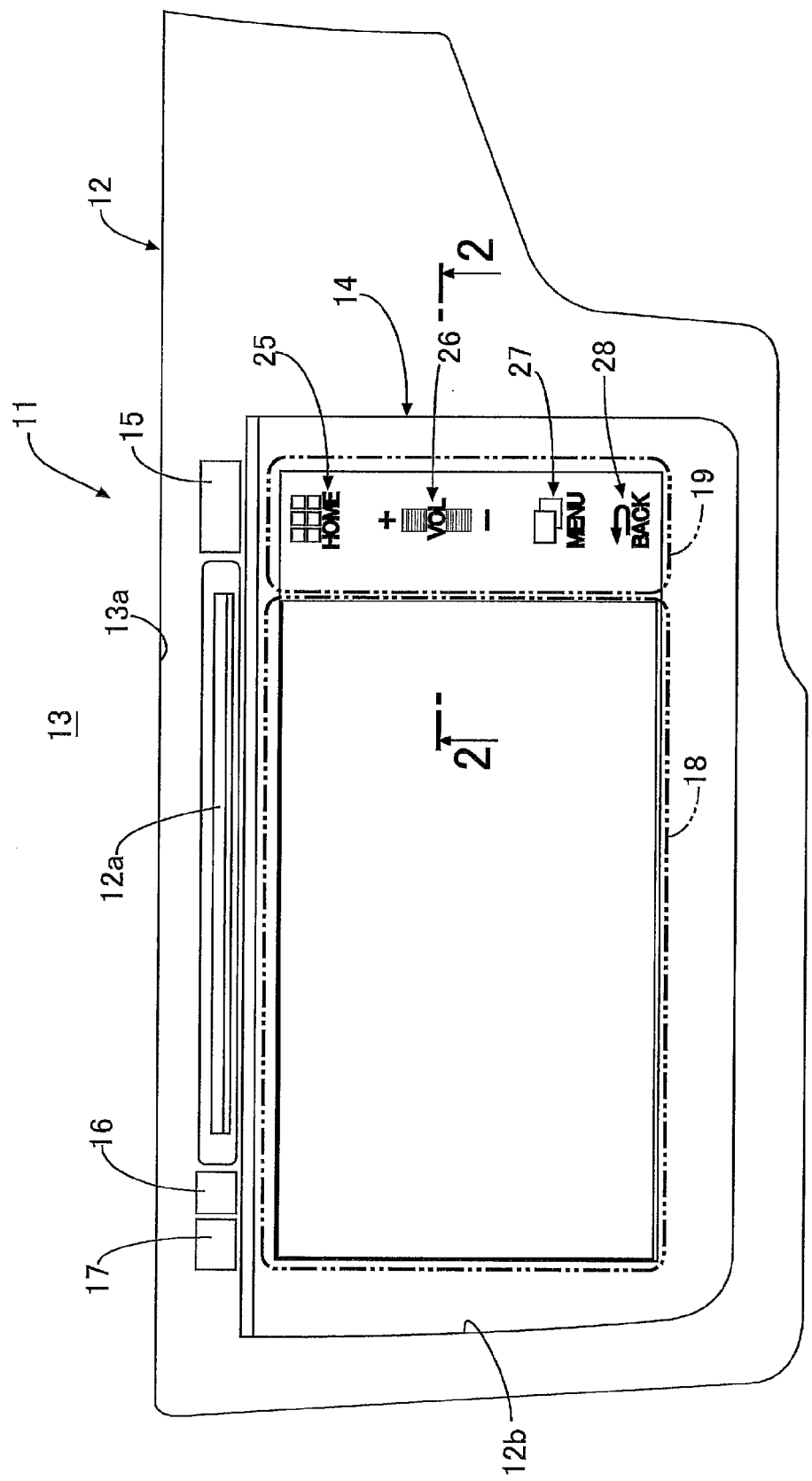
FIG. 1 is a front view of a vehicle-mounted display device. (first embodiment)

15 Power switch (hard switch)
16 Disk eject switch (hard switch)
17 Screen switching switch (hard switch)
18 Liquid crystal touch panel region
19 Software switch region
20A First transparent resin layer
20B Second transparent resin layer
21 Symbol and design printed layer
21a Translucent portion (symbol and design)
22 Smoke printed layer
23A First touch sensor sheet
23B Second touch sensor sheet
24 Diffusion sheet
32 Light source
34 Liquid crystal sheet

MODE FOR CARRYING OUT THE INVENTION

An embodiment of the present invention is explained below by reference to FIG. 1 to FIG. 3.

First Embodiment

As shown in FIG. 1, a vehicle-mounted display device 11 of the present embodiment is used as a display device for an AV device or a display device for a car navigation device, and a frame part 12 made of a synthetic resin is fixedly fitted into an opening portion 13a formed in an instrument panel 13. A rectangular display part 14 is provided in the middle of the frame part 12, a slit 12a is formed in the frame part 12 above the display part 14 for a CD or a DVD to be inserted, and there are provided on the left and right of the slit 12a three hard switches having high importance or urgency of operation, that is, a power switch 15 for turning a power source ON/OFF, a disk eject switch 16 for ejecting a CD or a DVD, and a screen switching switch 17 for turning a screen of the display part 14 OFF or switching the brightness of the display part 14 between day use and night use.

The display part 14 of the vehicle-mounted display device 11 is partitioned into a liquid crystal touch panel region 18 that occupies the majority thereof and a software switch region 19 that is formed in portrait format along the right-hand side of the liquid crystal touch panel region 18 (on the driver's side for a right hand drive vehicle). The liquid crystal touch panel region 18 is a region that mainly displays a television image or a map, and the software switch region 19 is a region that mainly displays software switches.

Figure 2:
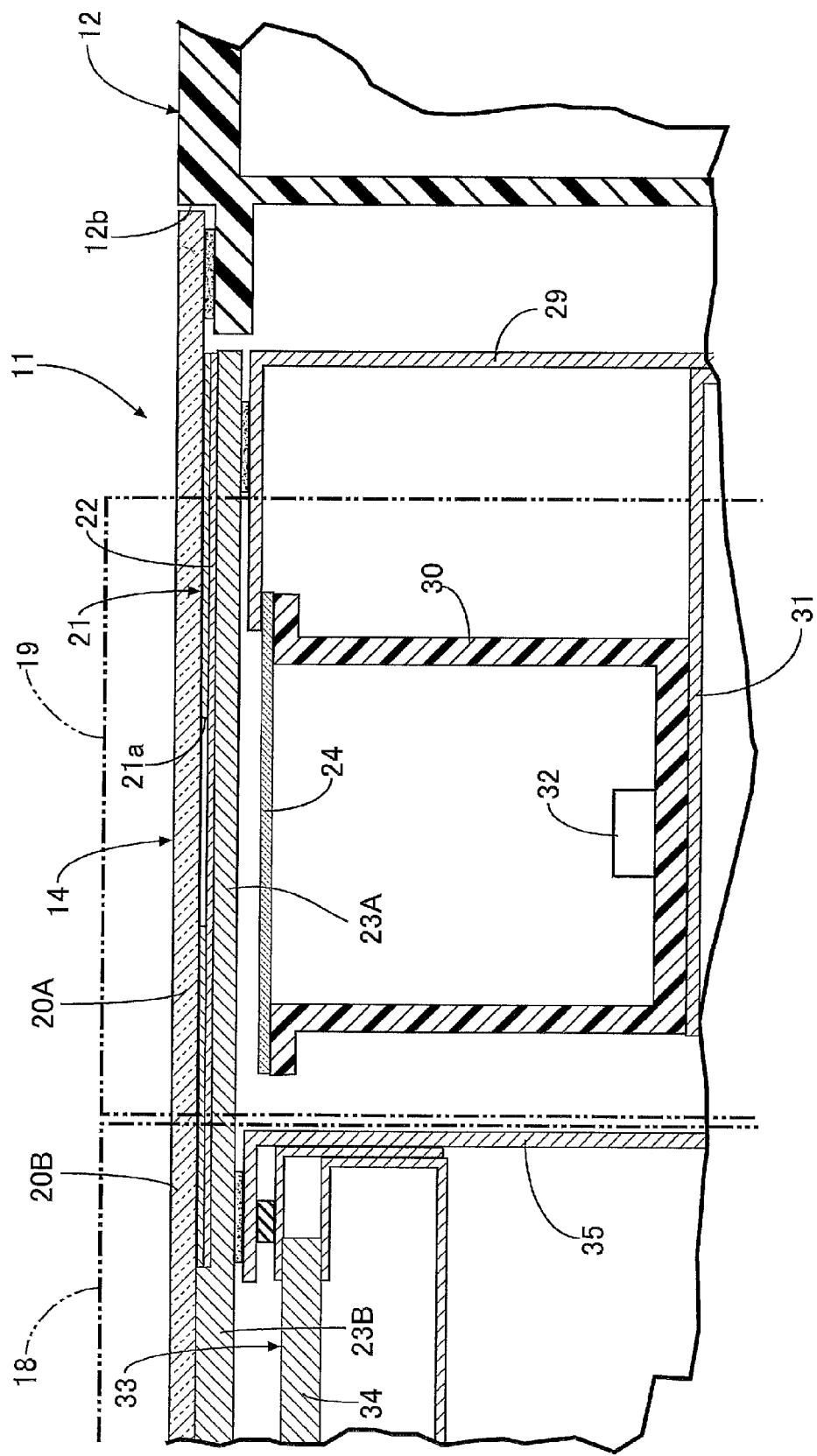
FIG. 2 is a sectional view along line 2-2 in FIG. 1. (first embodiment)

As shown in FIG. 2, which is a sectional view along line 2-2 in FIG. 1, the software switch region 19 includes a first transparent resin layer 20A that is positioned on the frontmost side (on the vehicle compartment side), a symbol and design printed layer 21 that is layered on the reverse side thereof, a smoke printed layer 22 that is layered on the reverse side thereof, a first touch sensor sheet 23A that is layered on the reverse side thereof, and a diffusion sheet 24 that is layered on the reverse side thereof with a small gap therebetween.

The first transparent resin layer 20A is formed from a panel made of a transparent polycarbonate. The symbol and design printed layer 21 is printed on the reverse side of the first transparent resin layer 20A using a dark color such as a black color, and part thereof is not printed to thus form a predetermined graphic or character as a translucent portion 21a. This translucent portion 21a displays a home switch 25, a volume switch 26, a menu switch 27, and a back switch 28 in the embodiment (see FIG. 1). The home switch 25 is a switch that makes a transition to an initial screen, the volume switch 26 is a switch that is for adjusting the sound volume, the menu switch 27 is a switch that makes a transition to a menu screen, and the back switch 28 is a switch that is for returning to a previous screen.

The smoke printed layer 22 is printed on the reverse side of the symbol and design printed layer 21 by a smoke printing method and is formed from a semitransparent layer that partially transmits light. The first touch sensor sheet 23A has a known structure formed from a glass panel, and exhibits a switching function by detecting the contact of a human fingertip based on a change in capacitance. The diffusion sheet 24 is formed from a synthetic resin sheet that does not reflect light in one direction but diffuses it.

The first transparent resin layer 20A, the symbol and design printed layer 21, the smoke printed layer 22, and the first touch sensor sheet 23A are integrated and fixed to the opening portion 12b of the frame part 12 and a stay 29 disposed in the interior of the frame part 12. A container-shaped light source holder 30 is fixed to the reverse side of the diffusion sheet 24, and the diffusion sheet 24 and the light source holder 30 are fixed to the stay 29 and a stay 31 disposed in the interior of the frame part 12. A light source 32, formed from an LED, is provided on the bottom of the light source holder 30.

The liquid crystal touch panel region 18 includes a second transparent resin layer 20B that is positioned on the frontmost side (the vehicle compartment side), a second touch sensor sheet 23B that is layered on the reverse side thereof, and a liquid crystal unit 33 that is disposed to the rear thereof. A liquid crystal sheet 34 of the liquid crystal unit 33 is layered on the reverse side of the second touch sensor sheet 23B with a small gap therebetween. The first transparent resin layer 20A of the software switch region 19 and the second transparent resin layer 20B of the liquid crystal touch panel region 18 are one and the same integrally formed member. The first touch sensor sheet 23A of the software switch region 19 and the second touch sensor sheet 23B of the liquid crystal touch panel region 18 are one and the same integrally formed member. The rear face of the second touch sensor sheet 23B and the liquid crystal unit 33 are fixed to a stay 35 disposed in the interior of the frame part 12.

The operation of the embodiment of the present invention having the above arrangement is now explained.

Since switches for carrying out operations with high importance or urgency when operating the vehicle-mounted display device 11, that is, the power switch 15, the disk eject switch 16, and the screen switching switch 17, are formed as hard switches having the highest visibility, not only does the operation thereof become easy, but it is also possible to carry out necessary switching even when the first touch sensor sheet 23A or the second touch sensor sheet 23B is not activated. Furthermore, since switches for carrying out a screen operation of the display part 14, that is, the home switch 25, the volume switch 26, the menu switch 27, and the back switch 28, are disposed together on the software switch region 19, which is positioned closer to the driver than is the liquid crystal touch panel region 18, it is possible to quickly carry out an operation with high frequency or an operation with high urgency.

Furthermore, the software switch region 19 has a structure in which the light diffusion sheet 24, the first touch sensor sheet 23A, the smoke printed layer 22, the symbol and design printed layer 21, and the first transparent resin layer 20A are layered in order from the back side toward the front side, the symbol and design printed layer 21 cannot transmit light via a part other than the translucent portion 21a, light from the light source 32 disposed on the bottom of the light source holder 30 only passes through the translucent portion 21a for the symbol and design printed layer 21 to the front side, and the graphic or character of the home switch 25, the volume switch 26, the menu switch 27, and the back switch 28 that corresponds to the shape of the translucent portion 21a is displayed on the front face of the first transparent resin layer 20A. Therefore, the first touch sensor sheet 23A detects a change in capacitance when an operator touches a given switch with a fingertip, thus enabling ON/OFF operation of the switch.

In a state in which operation of the software switch region 19 is not possible (inactive state), the light source 32 is turned off or its luminance is decreased to thus make the graphic or character of each switch disappear, and the entire software switch region 19 becomes black, which is the color of the symbol and design printed layer 21. In this process, if the internal structure of the light source 32, etc. on the back side were to be seen through the translucent portion 21a of the symbol and design printed layer 21, the aesthetics of the software switch region 19 would be impaired, but since the smoke printed layer 22, which is formed from the semitransparent layer that partially transmits light, is layered on the symbol and design printed layer 21, it makes it harder to see the internal structure, thereby ensuring the aesthetics of the software switch region 19.

Furthermore, there is the problem that, in a state in which light from the light source 32 enables each switch to be displayed and the software switch region 19 becomes operable (active state), if strong light such as direct sunlight shines on the front face of the first transparent resin layer 20A, the switches become harder to see, but in accordance with the present embodiment, without specially increasing the luminance of the light source 32, it is possible to diffuse light by means of the diffusion sheet 24, thus ensuring that the switches are visible. Moreover, since light is poorly transmitted by the diffusion sheet 24 it is possible, in cooperation with the smoke printed layer 22, to more reliably prevent the internal structure from being seen through the translucent portion 21a at a nonactive time, and it is also possible to easily identify whether or not the software switch region 19 is in the active state.

Furthermore, in accordance with the present embodiment, the function of the switch in the software switch region 19 is assisted by a switch in the liquid crystal touch panel region 18. For example, as shown in FIG. 3, the volume can be increased and decreased by sliding a portion with a '+' symbol and a portion with a '−' symbol of the volume switch 26 of the software switch region 19 with a fingertip, but in order to make the operation easier, when the volume switch 26 is tapped with a fingertip, a volume operating region 36 is newly displayed on part of the liquid crystal touch panel region 18, and the volume can be increased and decreased by sliding the volume operating region 36 with a fingertip. Since the volume operating region 36 is larger than the volume switch 26, the operation thereof becomes easy.

In this way, since when the software switch region 19 is operated, a region that can accept an operation is enlarged in the liquid crystal touch panel region 18, it becomes possible to carry out on the liquid crystal touch panel a delicate operation or a complicated operation that is too difficult to carry out with the software switch alone, thereby further improving the operability.

As described above, the software switch provided in the software switch region 19 and the liquid crystal touch panel region 18 not only has excellent durability due to there being fewer mechanical parts compared with a hard switch, but the degree of freedom in design is also increased due to it having no projecting portions. Moreover, since switching can be carried out by the use in combination of the software switch region 19, which has higher visibility compared with the liquid crystal touch panel region 18, and the liquid crystal touch panel region 18, which can display various images, it is possible to achieve a balance between visibility and operability.

Furthermore, since the first transparent resin layer 20A of the software switch region 19 and the second transparent resin layer 20B of the liquid crystal touch panel region 18 are formed from one and the same continuous layer, the front face of the display part 14 becomes a flat shape without any steps, not only does the design improve, but movement of a finger between the software switch region 19 and the liquid crystal touch panel region 18 also becomes smooth, thus improving the operability. Moreover, since the first touch sensor sheet 23A of the software switch region 19 and the second touch sensor sheet 23B of the liquid crystal touch panel region 18 are formed from one and the same continuous sheet, it is possible to reduce the cost by sharing a detection circuit for touch operation and a signal transmission circuit for an arithmetic processing unit.

An embodiment of the present invention is explained above, but the present invention may be modified in a variety of ways as long as the modifications do not depart from the spirit and scope thereof.

For example, in the embodiment the first transparent resin layer 20A and the second transparent resin layer 20B are formed from one member, but they may be split and formed from separate members.

Furthermore, in the embodiment the first touch sensor sheet 23A and the second touch sensor sheet 23B are formed from one member, but they may be split and formed from separate members.

Moreover, the functions of the software switches and the hard switches of the present invention are not limited to those of the embodiment.

The invention claimed is:

1. A vehicle-mounted display device comprising a software switch region in which a first transparent resin layer, a symbol and design printed layer, a smoke printed layer, a first touch sensor sheet, and a diffusion sheet are layered in order from a front side toward a back side, and a liquid crystal touch panel region in which a second transparent resin layer, a second touch sensor sheet and a liquid crystal sheet are layered in order from the front side toward the back side, wherein the software switch region is formed such that a light source is provided on a light source holder, a symbol and design printed on the symbol and design printed layer is visible from the front side by shining light from the light source from the back side, and the diffusion sheet is fixed to the light source holder with a gap between the diffusion sheet and the first touch sensor sheet.

2. The vehicle-mounted display device according to claim 1, wherein when the software switch region is in an inactive state in which the software switch region does not accept an operation, the software switch region displays the inactive state by turning off the light source or reducing luminance of the light source.

3. The vehicle-mounted display device according to claim 2, wherein a hard switch that can be operated even when the software switch region and the liquid crystal touch panel region are in the inactive state is provided outside the software switch region and the liquid crystal touch panel region.

4. The vehicle-mounted display device according to claim 1, wherein when the software switch region is operated, a region that can accept an operation is enlarged in the liquid crystal touch panel region.

5. The vehicle-mounted display device according to claim 1, wherein the first transparent resin layer and the second transparent resin layer are formed as one and the same continuous layer.

6. The vehicle-mounted display device according to claim 5, wherein the first touch sensor sheet and the second touch sensor sheet are formed as one and the same continuous sheet.

7. The vehicle-mounted display device according to claim 1, wherein the first touch sensor sheet and the second touch sensor sheet are formed as one and the same continuous sheet.

8. The vehicle-mounted display device according to claim 1, wherein the software switch region is disposed at a position closer to a driver than is the liquid crystal touch panel region.

9. The vehicle-mounted display device according to claim 1, wherein a hard switch that can be operated even when the software switch region and the liquid crystal touch panel region are in the inactive state is provided outside the software switch region and the liquid crystal touch panel region.

* * * * *